(12) United States Patent
Yamaga et al.

(10) Patent No.: US 7,161,893 B2
(45) Date of Patent: Jan. 9, 2007

(54) STAMPER FOR FABRICATION OF OPTICAL RECORDING MEDIUM, METHOD OF FORMING INFORMATION RECORDING AREA AND LIGHT TRANSMISSIVE LAYER, AND OPTICAL RECORDING MEDIUM

(75) Inventors: Kenji Yamaga, Tokyo (JP); Tsuyoshi Komaki, Tokyo (JP); Kazuki Suzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 534 days.

(21) Appl. No.: 10/488,194

(22) PCT Filed: Aug. 21, 2002

(86) PCT No.: PCT/JP02/08399

§ 371 (c)(1),
(2), (4) Date: Mar. 1, 2004

(87) PCT Pub. No.: WO03/021590

PCT Pub. Date: Mar. 13, 2003

(65) Prior Publication Data

US 2005/0022224 A1    Jan. 27, 2005

(30) Foreign Application Priority Data

Aug. 28, 2001    (JP) ............................. 2001-258267

(51) Int. Cl.
*G11B 7/24* (2006.01)
(52) U.S. Cl. ............................... 369/275.4; 369/275.3; 369/44.26; 428/64.4

(58) Field of Classification Search ............. 369/275.1, 369/275.2, 275.3, 275.4, 277, 280, 125, 44.26, 369/112.17, 112.01, 47.53, 53.31, 275.5; 428/64.4, 64.5; 430/270.13, 945
See application file for complete search history.

(56) References Cited

U.S. PATENT DOCUMENTS 6,934,244 B1 * 8/2005 Tanaka et al. ........... 369/275.4

FOREIGN PATENT DOCUMENTS

| JP | A 58-137146 | 8/1983 |
| JP | A 60-246039 | 12/1985 |
| JP | 04-105823 | 9/1992 |
| JP | U 4-105283 | 9/1992 |
| JP | U-2004-105823 | 9/1992 |
| JP | A 6-76384 | 3/1994 |
| JP | A 8-235638 | 9/1996 |
| JP | A 11-58401 | 3/1999 |
| JP | A 11-86355 | 3/1999 |
| JP | A 11-86356 | 3/1999 |
| JP | A 11-203724 | 7/1999 |

* cited by examiner

*Primary Examiner*—Ali Neyzari
(74) *Attorney, Agent, or Firm*—Oliff & Berridge, PLC

(57) ABSTRACT

A surface treatment of a light transmissive layer by spin coating is carried out in a simple way at low cost. When a light transmissive layer is to be formed by spin coating, the transfer of an information recording layer is carried out using a resin stamper having a convex portion in an outer peripheral portion. At the same time, an inclined plane (concave portion) is formed on the side of a substrate (member on which transfer is performed). As a result, coating is achieved in such a manner that a raise in the outer peripheral portion is prevented from being noticeable.

9 Claims, 10 Drawing Sheets

(A)

(B)

(C)

STAMPER FOR FABRICATION OF OPTICAL RECORDING MEDIUM, METHOD OF FORMING INFORMATION RECORDING AREA AND LIGHT TRANSMISSIVE LAYER, AND OPTICAL RECORDING MEDIUM

This appl. is a 371 of RCT/JP02/08399 Aug. 21, 2002

CROSS-REFERENCE TO RELATED APPLICATION

The disclosure of Japanese Patent Application No. 2001-258267 filed Aug. 28, 2001 including the specification, drawings, and claims is incorporated herein by reference in its entirety.

BACKGROUND OF THE INVENTION

1. Field of Invention

The present invention relates to a stamper for fabrication of an optical recording medium, a method of forming an information recording area and a light transmissive layer using the stamper, and an optical recording medium.

2. Description of Related Art

Optical discs on which information signals are written by embossed pits are widely used as a form of optical recording media for audio and video, and for recording other various information. The basic form of optical disc is shown in FIG. 11. This optical disc 2 comprises an information recording layer 8 having a reflective film 6 on a light transmissive molded substrate (supporting plate) 4. A protective layer 12 made of an UV curable resin or the like is formed thereon. In this optical disc 2, a laser beam La is irradiated on the side of the molded substrate 4 acting as a light transmissive layer so as to read an information signal from the information recording layer 8.

A recording density of the optical disc 2 can be increased as a spot diameter of the used laser beam La is reduced. The spot diameter is proportional to: $\lambda/NA$ ($\lambda$: a wavelength of a laser beam, NA: a numerical aperture of an objective lens). Therefore, in order to reduce the spot diameter, it is necessary either to reduce the wavelength $\lambda$ of the laser beam La or to increase the numerical aperture NA of the objective lens.

With respect to the wavelength $\lambda$ of the laser beam La, a wavelength of 780 nm is used conventionally for CDs, whereas a wavelength of 650 nm is conventionally used for DVDs. A wavelength in the vicinity of 400 nm corresponding to a blue laser is expected for use in the future. Since the spot diameter is reduced for the decreased wavelength, a recording density is increased.

With respect to numerical aperture NA, coma aberration is increased as the numerical aperture NA is increased. In order to keep coma aberration small even with the increased numerical aperture NA, it is necessary to reduce a thickness of the light transmissive layer (the molded substrate 4) through which the laser beam La passes.

Conventionally, a molded product made of a resin, molded by injection molding or the like, is frequently used as the light transmissive layer (the molded substrate 4) of the optical disc 2. However, it is difficult to fabricate the molded substrate 4 to have a smaller thickness than that of currently used DVDs with good accuracy using this current technique. Specifically, in view of this current fabrication technique, the ability to increase a recording density by an increased NA in the optical disc 2 having a structure using the molded substrate 4 as a light transmissive layer, as shown in FIG. 11, has reached the acceptable limits.

To cope with this, a technique for achieving a further increase in an NA of laser beam by forming a light transmissive layer has been proposed in, for example, Japanese Patent Laid-Open Publication No. 1996-235638, Japanese Patent Laid-Open Publication No. 1999-203724, and the like.

Specifically, this technique as shown in FIG. 12, includes forming a molded substrate 50 that is not required to transmit any light. The substrate 50 is formed by injection molding to have a large thickness as a base of a disc body. Next, an information recording layer 54 having a reflective layer 52 is formed on the molded substrate 50. An extremely thin (at the maximum, about 300 μm) light transmissive layer 56 is deposited thereon by means, such as attachment of a light transmissive sheet, resin coating through spin coating, or the like.

The laser beam La is irradiated on the side of the thin light transmissive layer 56 to record and/or read information on and/or from the information recording layer 54. In this manner, it is possible to form the thinner light transmissive layer 56 while ensuring the strength of the disk due to the molded substrate 50. Therefore, a higher density (larger capacity) can be achieved by using a higher NA of the laser beam.

Under actual conditions, however, the above-described technique still has various problems with respect to forming the thin light transmissive layer.

Generally, as a method for forming the thin light transmissive layer, a method of bonding a transparent sheet onto a molded substrate (or a supporting plate), a method of applying (coating) a resin by spin coating, and the like have been proposed. However, the method of bonding a transparent sheet is likely to have elevated fabrication cost because strict optical characteristics of the sheet and accuracy in its thickness are required. Moreover, even if the thickness of the transparent sheet is accurate, an uneven thickness or uneven application of an adhesive may still change the optical characteristics of the layer. Thus, high accuracy is required even for the application of an adhesive. Accordingly, under the actual conditions, many problems remain in this method.

The method of forming a thin light transmissive layer by application of a resin through spin coating specifically consists of making a liquid UV curable resin (applied liquid) flow on a surface of a molded substrate (supporting plate) while rotating the molded substrate with a spindle so that the resin is uniformly spread in accordance with the rotation of the molded substrate to coat the resin layer. Thereafter, the coated resin is cured by irradiation with ultraviolet radiation. According to this method, various conditions such as a thickness of the coating can be adjusted by controlling a rotation speed of the spindle, application time, and a viscosity of the applied liquid.

However, this method has a problem in that the flatness of the surface of the coating film is difficult to maintain. A concentration (raise) of the application liquid is likely to occur, in particular, in the vicinity of the outer periphery. The raise does not become such a serious problem in the case where there is a relatively large distance between a laser optical system and a disc such as in a conventional CD and DVD. However, under the conditions where a gap between a laser optical system and a disc is reduced, such as shown in FIG. 12, it becomes problematic.

In particular, in the case where a relatively thick (for example, 100 μm) coating layer is formed, a thickness or a radial width of the raise may become too large in an information recording area. Therefore, if no countermeasure is taken, there is a possibility that the raise will reduce a recordable area in the vicinity of the outer periphery so that the recording/reading of information signals to be obtained may be impaired. Moreover, the raise may also cause the collision of a laser optical system against a disc.

Regarding a treatment of the raise or the maintenance of smoothness of the coating surface, various proposals for ways of coping with them have been made in, for example, Japanese Patent Laid-Open Publication Nos. 1999-203724, 1999-86355, 1999-86356, and the like. However, these methods merely fix the problem after it has occurred rather than preventing it. Therefore, the fabrication process is complicated and fabrication costs are increased.

SUMMARY OF THE INVENTION

Various exemplary embodiments of this invention solve the above-described problems by developing a stamper having a predetermined structure. Furthermore, various exemplary embodiments of the invention provide a stamper usable to fabricate an optical recording medium with a resin coating layer and in particular, with a resin coating layer formed by spin coating. The stamper, according to the various exemplary embodiments, is capable of easily achieving a flattening of the upper surface of the resin coating layer that contributes to "increase in capacity," and/or contributes to a "reduction in cost." Various exemplary embodiments of the invention also provide a method of forming an information recording area and a light transmissive layer in an optical recording medium using the stamper.

Accordingly, various exemplary embodiments of the invention provide a stamper for fabrication of an optical recording medium, including an information recording area having predetermined minute concavity and convexity on a transfer surface. The stamper is used for transferring the minute concavity and convexity in the information recording area onto an information recording area on a surface of a member. Only transfer of the minute concavity and convexity in the information recording area is performed by the member and the member does not ultimately serve as a constituting element of an optical recording medium. Particularly, a surface of an outer peripheral portion of the information recording area on the transfer surface is formed so as to be biased in a convex shape from the surface of the information recording area toward the member on which transfer is performed.

As described above, a technique of coating the information recording layer having a reflective film with a resin by spin coating and irradiating a laser beam on the side of this (extremely thin) resin coating layer using the resin coating layer as a light transmissive layer, is extremely desirable in that a recording density for each layer can be remarkably improved.

As a result, various exemplary embodiments of the invention, by using this technique in combination with the above-described stamper, solve the problem of ensuring the flatness of the upper surface of the resin coating layer.

Since the stamper according to various exemplary embodiments of the invention is literally a "stamper," it does not constitute part of the resulting optical recording medium. Specifically, the stamper is removed after transfer of the minute concavity and convexity on the information recording area of the information recording layer. Moreover, the stamper is also intended to be used in the steps of coating the upper surface of the information recording layer, on which transfer is performed by the stamper, with a resin, and irradiating a laser beam on the resin-coated side.

Therefore, in contrast to a conventional stamper (conventional CDs, DVDs and the like), the stamper according to various exemplary embodiments of the invention has the minute concavity and convexity in which a wobble signal is formed on a groove in its own information recording area, in the case where, for example, it is used for fabrication of a recordable disc.

Because the above-described stamper is generally for transferring the predetermined minute concavity and convexity on the surface on which transfer is performed, its surface is substantially flat. Various exemplary embodiments of the stamper according to the invention also control the shape of the light transmissive layer the by forming a concave shape on the surface of the outer peripheral portion of the information recording area, on which transfer is performed, when the minute concavity and convexity are transferred. Therefore, various exemplary embodiments of the stamper according to the invention also have the bias in a convex shape, which allows for the shape control, on the surface of the outer peripheral portion of the information recording area on which transfer is performed.

If the surface in the outer peripheral portion of the information recording area on which transfer is performed is biased in a concave shape, a raise (which is conventionally present on the side of the outer periphery on the upper surface of the resin coating layer) can be substantially prevented. As a result, special measures for flattening the upper surface of the resin coating layer, (conventionally essential) is no longer required. Moreover, because the transfer of the minute concavity and convexity is an essential step, the bias in a concave shape can be formed simultaneously with the execution of the transfer. Therefore, once the stamper is produced, the number of steps required for production of an optical recording medium is not increased.

As a result, according to the various exemplary embodiments of the invention, an optical recording medium, in which access can be made from the side of a thin light transmissive layer (from the resin-coated side) and that permits recording at a high density, can be fabricated at low cost in a simple manner.

Furthermore, according to various exemplary embodiments of the stamper according to the present invention, the shape of the outer periphery on the side of the member, on which transfer is performed, can be easily changed into a predetermined shape without changing a mold body itself. Therefore, even when a composition or a thickness of a resin material for coating is changed or the like, the optimally corresponding outer peripheral shape may be easily obtained.

As described below, the stamper according to the present invention may be used as a stamper for forming an information recording layer of an optical recording medium including only one information recording layer or as a stamper for forming information recording layers of a multi-layered optical recording medium.

Various exemplary embodiments of the invention also provide a method of forming an information recording layer and a light transmissive layer including using the stamper for fabrication of an optical recording medium to transfer the minute concavity and convexity onto an information recording area of the member on which transfer is performed and to form a bias in a concave shape corresponding to the convex shape, on a surface of its outer periphery; forming a reflective film and/or a recording film at least on the minute concavity and convexity; and forming a resin layer serving as a light transmissive layer on the member, on which transfer is performed, including the reflective film and/or the recording film and the biased portion in the concave shape.

BRIEF DESCRIPTION OF THE DRAWINGS

Various exemplary embodiments of the present invention will be described in detail with reference to the accompanying drawings, wherein.

DETAILED DESCRIPTION OF EXEMPLARY EMBODIMENTS

Figure 1:
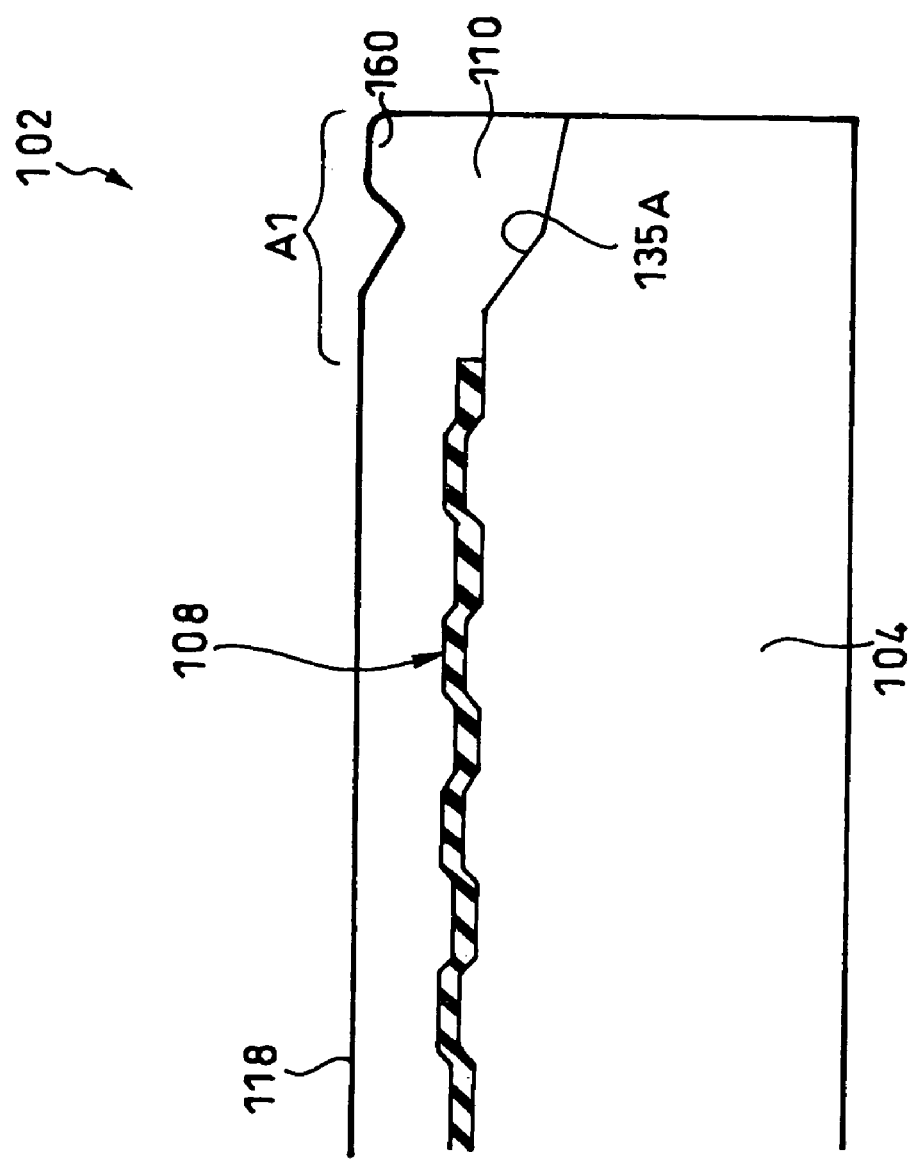
FIG. 1 is an enlarged cross-sectional view of a substantial part, schematically illustrating a structure in the vicinity of an outer peripheral portion of an optical disc formed by using a stamper according to the present invention.

FIG. 1 schematically shows a cross section of an optical disc (optical recording medium) fabricated by using a stamper according to an exemplary embodiment of the invention. The optical disc 102 includes: a substrate 104; an information recording layer 108 formed on the substrate 104; and a light transmissive layer 110 formed on the information recording layer 108. On the light transmissive layer 110, a protective layer 118 is formed, as needed. A laser beam (not shown) is irradiated on the side of the light transmissive layer 110 so as to record and/or read an information signal on/from the information recording layer 108. In an outer peripheral portion A1 of each layer in the optical disc 102, a predetermined curved pattern 135A is formed by the stamper.

Figure 12:
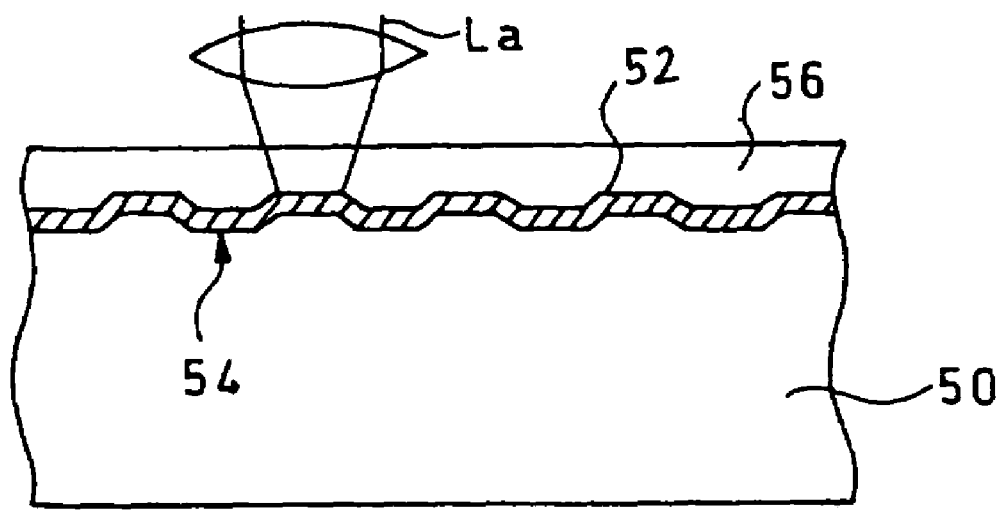
FIG. 12 is a partially enlarged cross-sectional view showing a conventional example of the type in which laser beam is irradiated on the side of a thin light transmissive layer.

The above-described substrate 104 and information recording layer 108 have basically the same functions as those of the protective plate 50 and the information recording layer 54 in the conventional example shown in FIG. 12. However, the fabrication thereof is different. Substrate 104 and information recording layer 108 are formed by the procedure shown in FIG. 2.

Figure 2:
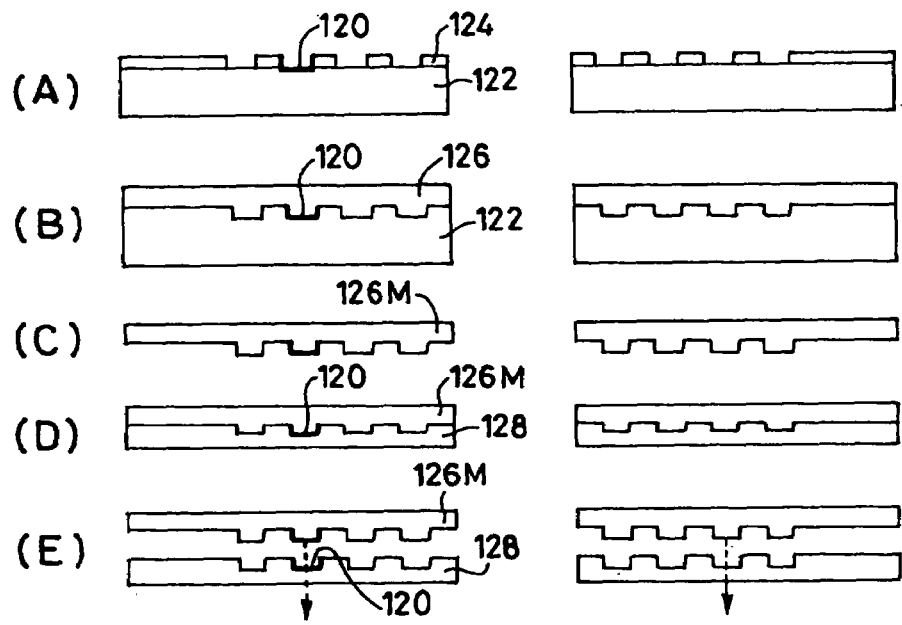
FIG. 2 is a process chart showing a series of procedures for molding a substrate from a master stamper.
Figure 2:
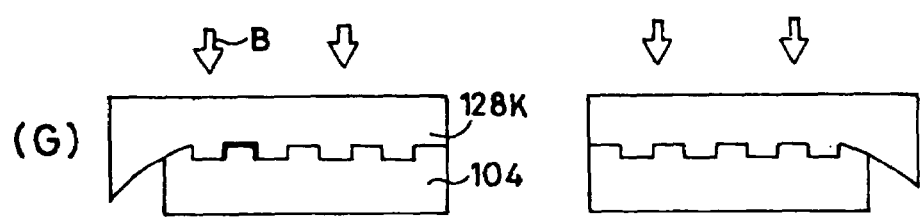
Figure 2:
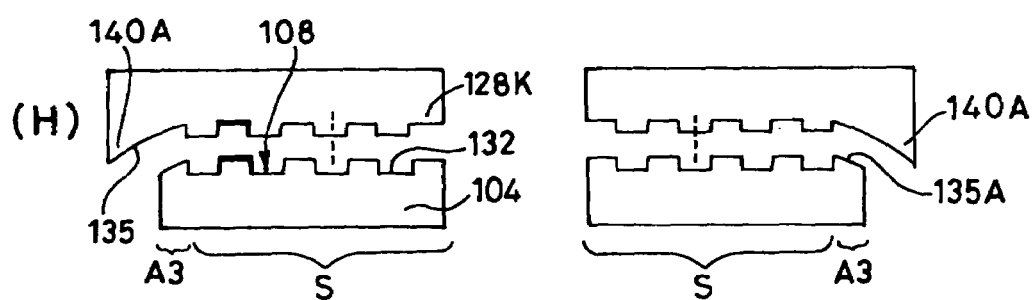

FIG. 2 shows an example where recording is performed only in grooves. The grooves correspond to minute concavity when a concave-convex surface is viewed from the side close to a pickup. The groove slightly meanders (wobbles) and is used as an address in recording (positional information on a blank disc). In FIG. 2, the reference numeral 120 denotes a portion where a wobble signal is formed.

For ease of explanation, a pattern in the information recording layer 108 that is formed when viewed from the pickup in the optical disc 102 is denoted as a positive pattern and a reversed pattern is denoted as a negative pattern. More specifically, the wobble signal 120 is present in a groove portion in the positive pattern while being present in a "land" portion in the negative pattern.

In FIG. 2, a photoresist layer (photosensitive material) 124 is first provided on a glass original disc 122 and then irradiated with a laser to form grooves (the positive pattern) with wobbles by development, or the like (FIG. 2(A)). Next, an electrically conductive film is provided so as to form a nickel-plating layer 126 by so-called electrocasting (FIG. 2(B)).

Thereafter, the nickel-plating layer 126 is removed from the glass original disc 122 so as to perform a post-treatment. As a result, a so-called master stamper 126M having a negative pattern is completed (FIG. 2(C)).

Normally, in the case of the type of optical disc in which access is made from the side of the substrate, the master stamper 126M is used or a mother stamper (positive pattern) is produced from the master stamper 126M to produce a child stamper (negative pattern) for production of a substrate having the positive pattern.

In this embodiment, however, the laser beam is not irradiated not on the side of the substrate 104 but on the side of the light transmissive layer 110. Therefore, a mother stamper 128 having a positive pattern is produced from the master stamper 126M. The mother stamper 128 is completed by performing a surface treatment on the master stamper 126M, performing electroplating by electrocasting, and then removing the electroplating (FIGS. 2(D) and (E)).

Figure 3:
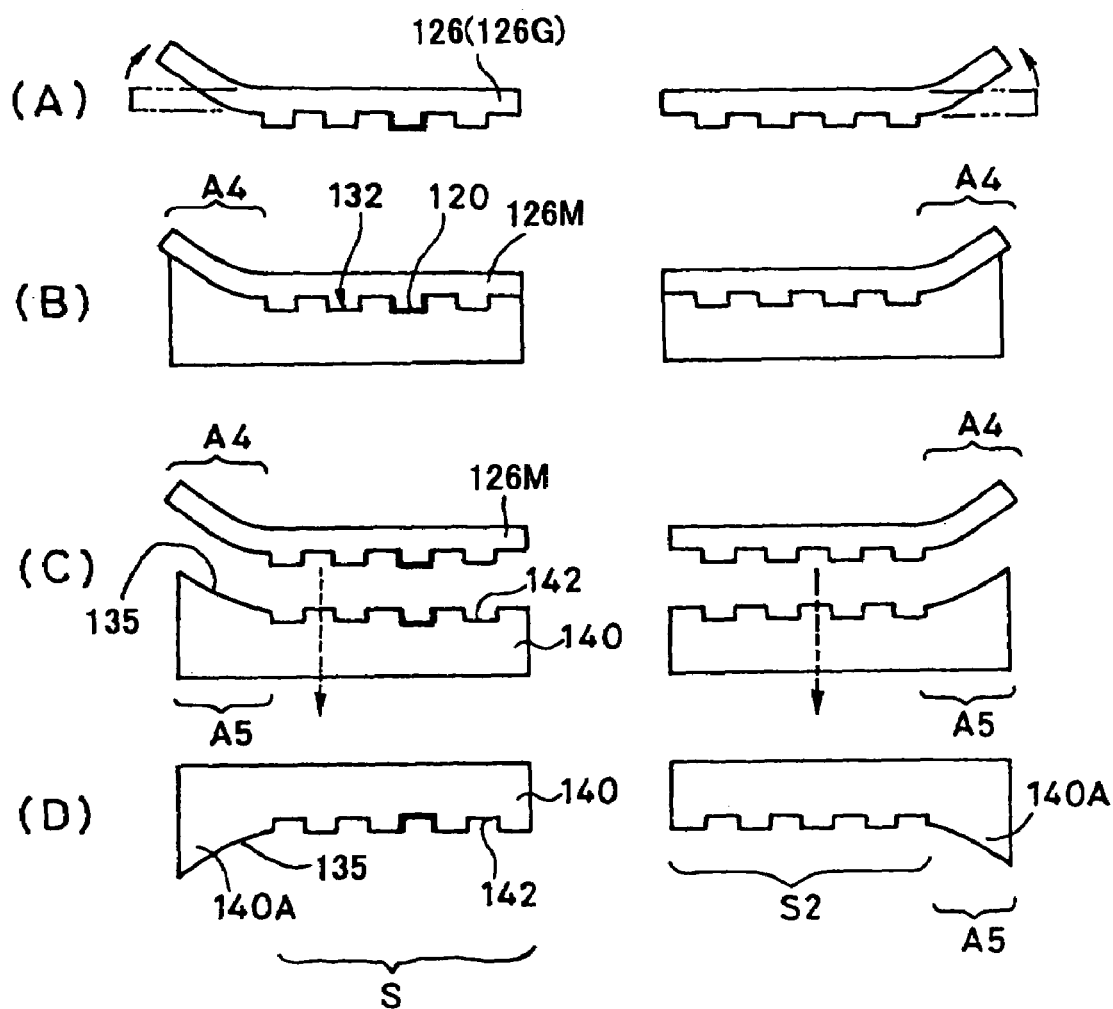
FIG. 3 is a process chart showing a procedure for producing a resin stamper from the master stamper.

Next, as shown in FIG. 3, a resin stamper (since it is made of a resin in this embodiment, it is referred to as a resin stamper, for convenience) 140 for forming the information recording layer 108 on the basis of the master stamper 126M (or the child stamper 126G) is produced.

Figure 4:
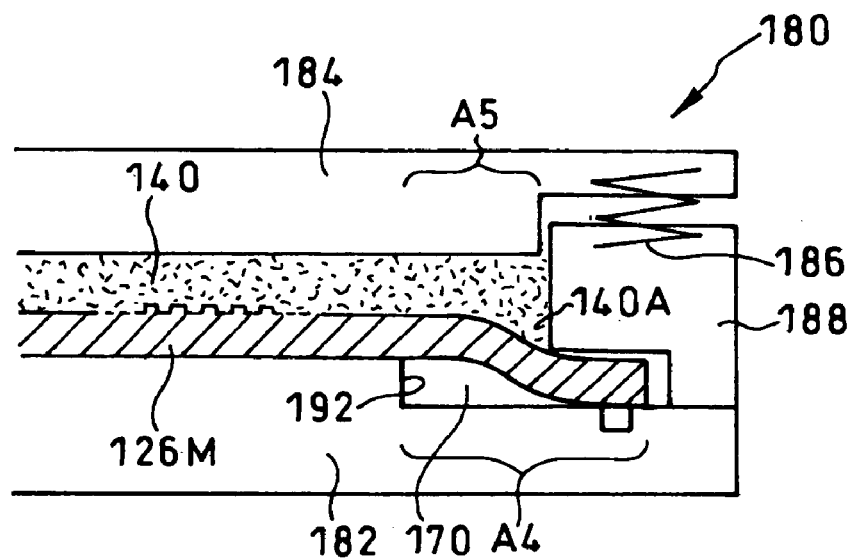
FIG. 4 is a cross-sectional view showing the schematic of a mold assembly for fabricating the resin stamper.

Specifically, first, as shown in FIGS. 3(A) and (B), an outer peripheral portion A4 of the master stamper 126M (or the child stamper 126G) is bent to the side opposite the side where minute concave and convex portions 132 are present so as to produce a master stamper 126M (or a child stamper 126G) for resin stamper 140. More specifically, it is fixed while being bent toward a stationary mold 182 of a mold 180 as shown in FIG. 4 (FIGS. 3(A) and (B)). In FIG. 4, the reference numeral 184 denotes a movable mold; 186 a spring; 188 an outer peripheral ring; 170 a concave portion; and 192 a ring-shaped concave portion. In this state, a resin for constituting the resin stamper 140 is injected and molded between the movable mold 184 of the mold 180 and the master stamper 126M for resin stamper 140 and is then removed. As a result, the resin stamper 140 having minute concave and convex portions 142 corresponding to the positive pattern of the information recording layer 108 is completed (FIGS. 3(B) and (C)).

Although the resin stamper 140 is a stamper, it has a positive pattern (the wobble signal 120 is present in the groove) and a convex portion (convex bias) 140A projecting toward a transferred surface (the substrate 104) in an outer peripheral portion A5 (FIG. 3(D)). Specifically, the bias, in a convex shape on the surface of the outer peripheral portion A5, is formed as an inclined plane 135 that is biased from the surface of an information recording area S by about 20 µm or more (5 µm or more) (described below).

Figure 5:
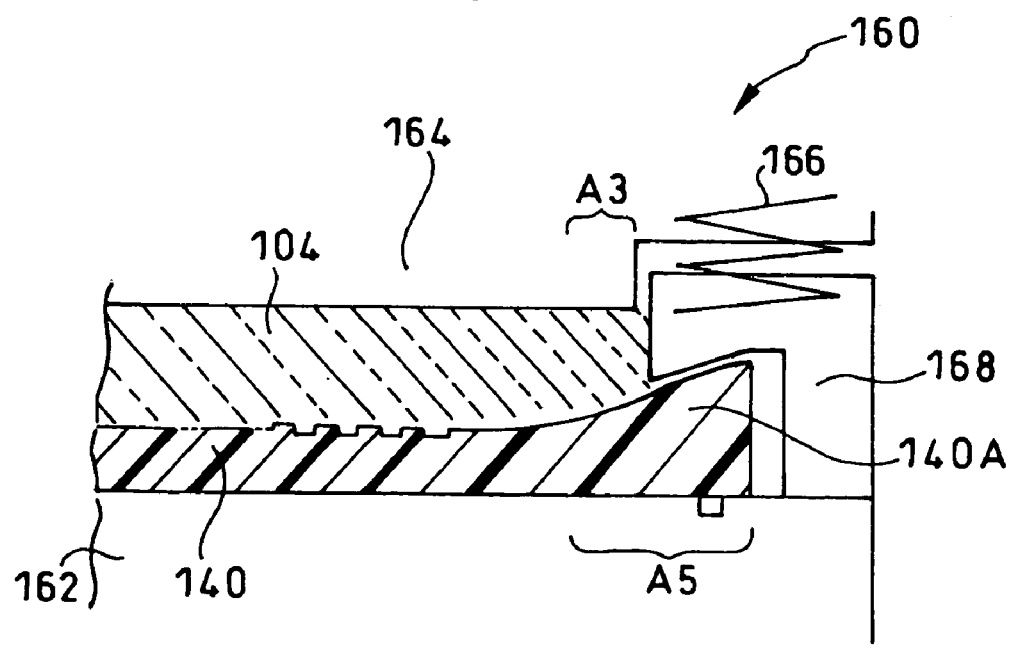
FIG. 5 is a cross-sectional view showing the schematic of a mold assembly for producing the substrate.

The resin stamper 140 is fixed to the mold 160 so as to be used for molding the substrate 104, as shown in FIGS. 2(G), 2(F), and 5. In FIG. 5, the reference numeral 162 denotes a stationary mold; 164 a movable mold; 166 a spring; and 168 an outer peripheral ring. The resin constituting the substrate 104 is injected and molded in a space sandwiched between the movable mold 164 and the resin stamper 140.

Returning to FIG. 2, when the resin constituting the substrate 104 is made to fill the mold 160 by using the resin stamper 140, the substrate 104 having minute concave and convex portions (information recording area) 132 corresponding to the negative pattern of the information recording layer 108 is completed (FIGS. 2(G) to (H)). In an outer peripheral portion A3 of the minute concave and convex portions 132 on the substrate 104, an inclined plane (concave portion) 135A corresponding to the above-described convex portion 140A of the resin stamper 140 is formed. A thickness of the outer peripheral portion A3 is gradually reduced in an outer radial direction, as compared with that of the information recording area S.

Herein, if a resin P constituting the substrate 104 is a UV curable type resin, the resin stamper 140 is made of a light transmissive resin. As a result, ultraviolet irradiation may pass through the resin stamper 140 to fix the substrate 104.

Specifically, the substrate 104 in this embodiment does not have (is not required to have) any functions as a light transmissive layer. Therefore, it is not necessarily required to be formed of a light transmissive resin. On the other hand, generally, in a transfer method as is represented by a 2P method, an ultraviolet ray is generally irradiated on the side of a member on which transfer is performed, that is, on the side of the substrate 104 in this embodiment. However, if the resin constituting the substrate 104 is made of a non-light transmissive resin, it is extremely inefficient (impossible in some cases) to irradiate an ultraviolet ray on the side of the substrate 104. Moreover, as described below, in the case of a double-layered type optical storage media, since the first information recording layer has already been formed, a similar problem occurs. However, if a light transmissive resin is used for the resin stamper 140 and the resin P constituting the substrate 104 is an UV curable type resin, an ultraviolet ray B may be irradiated on the side of the resin stamper 104 to cure the substrate 104. Therefore, there is no wasted irradiation energy. Moreover, it is unnecessary to increase the size of the ultraviolet ray irradiation system. This effect can be sufficiently obtained if a light transmissive resin having a wavelength of 300 nm to 400 nm and a transmittance of 50% or more is used as a material for the resin stamper 140.

For a similar reason, it is also effective to heat substrate 104, which is a member on which transfer is performed, by some sort of method and to use a thermally curable resin for the substrate 104 in view of the dispensability of ultraviolet ray irradiation on the side of the member on which transfer is performed.

Furthermore, the stamper according to various exemplary embodiments of the invention is not necessarily required to be a resin or a light transmissible material. In the field of optical recording media, however, equipment and know-how for curing an UV curable type resin with ultraviolet ray irradiation are well known. In consideration of the possibility of low-cost fabrication and the reliability or the degree of freedom in formation of the minute concavity and convexity on the transfer surface of the stamper and in formation of the convex shape on the outer peripheral side, it is preferable with respect to fabrication cost that a stamper is formed of a light transmissible resin that is excellent in moldability, and the substrate 104 made of an UV curable type resin that is cured by ultraviolet ray irradiation on the side of the stamper.

By removal of the resin stamper 140, the (negative pattern of) information recording layer 108 is formed on the substrate 104. The information recording layer 108 is extremely thin and reflects the shape of the minute concave and convex portions 132 in the negative pattern. Therefore, when it is viewed from the side of a pickup, it has the minute concavity and convexity 132 of the positive pattern in the information recording layer 108.

Figure 6:
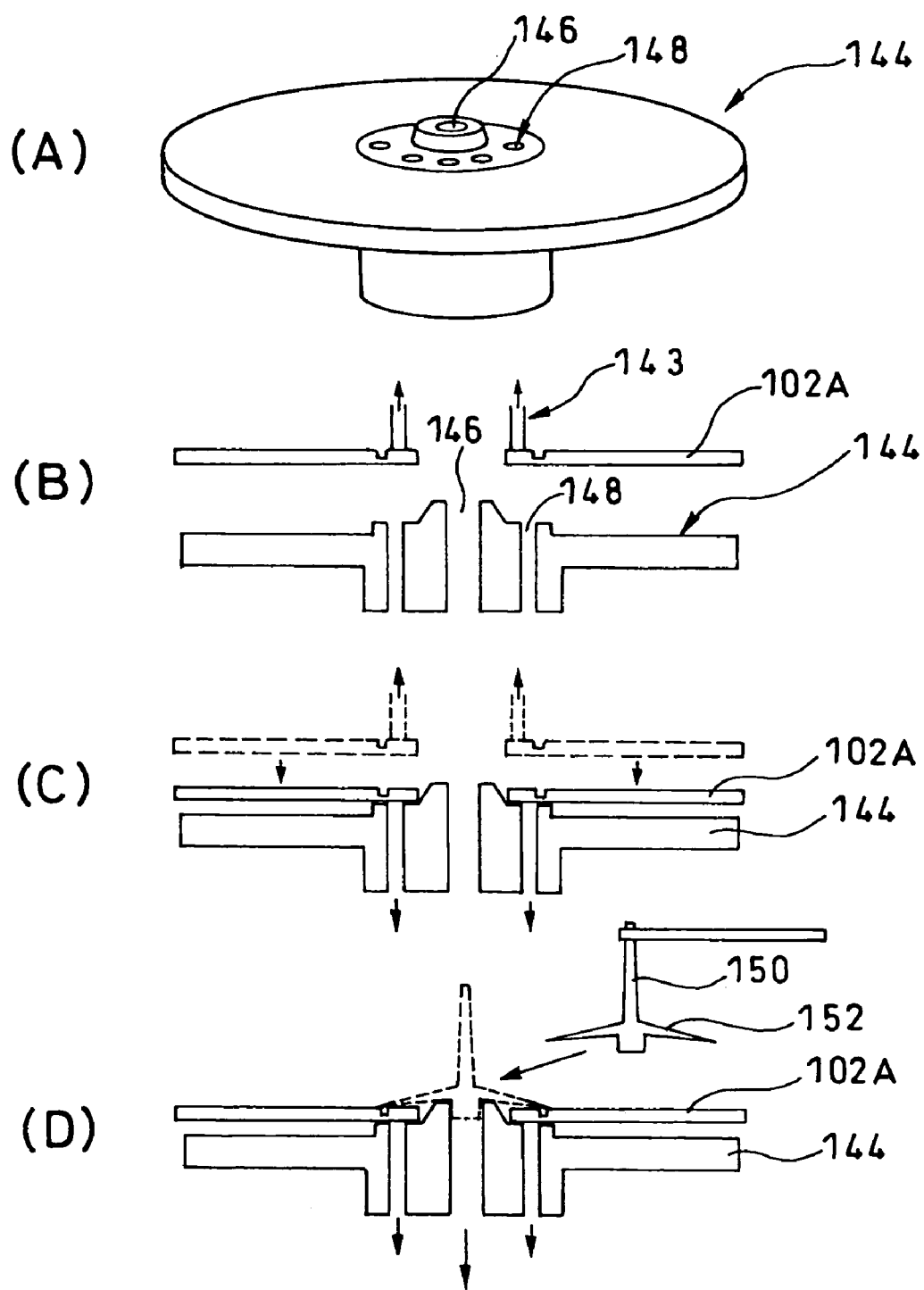
FIG. 6 is a process chart showing the first half of the step of coating a resin constituting a light transmissive layer by spin coating.
Figure 7:
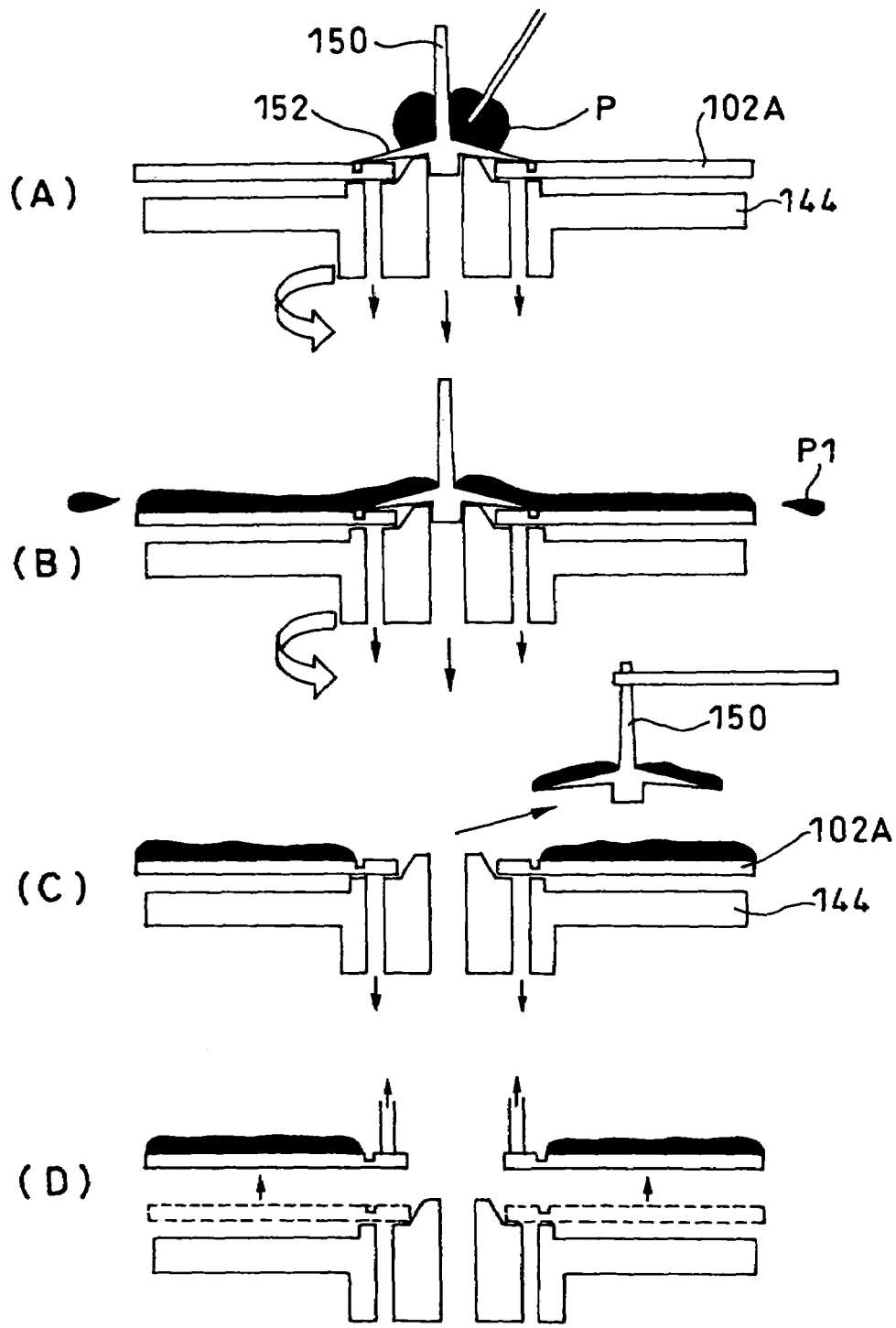
FIG. 7 is a process chart showing the second half of the above step.

The light transmission layer 110 is formed on the upper surfaces of the information recording layer 108 and the concave portion 135A. This light transmissive layer 110 is formed by spin coating as shown in FIGS. 6 and 7.

FIG. 6(A) shows a coating stage (coating table) 144. In the center of the coating stage 144, a suction port 146 for sucking a cap 150, described below, is provided. A plurality of suction ports 148 for sucking an optical disc (optical disc in the state in FIG. 2(H)) 102A are provided around the cap 150.

First, the optical disc 102A, on which the information recording layer 108 is formed, is placed on the coating stage 144 while being sucked and held by suction means 143 (FIGS. 6(B) and (C)). Next, the cap 150 is placed in the center of the optical disc 102A. Owing to the suction through the suction ports 146 and 148, both of the disk 102A and cap 150 are fixed onto the coating stage 144 (FIG. 6(D)).

In order to form an excellent light transmissive layer, and since it is required to prevent bubbles from entering the resin to be coated, an inclined plane 152 of the cap 150 is desirably a mirror face. Moreover, in order to prevent the optical disc 102A from being damaged, it is desired that a portion in contact with the optical disc 102A is somewhat soft. Therefore, the cap 150 is preferably made of a resin.

As shown in FIG. 7(A), the coating stage 144 is slowly rotated while suction is continuously performed so that the resin P is dropped onto the inclined plane 152 of the cap 150. As a result, the resin P is spread along the inclined plane 152 by centrifugal force. An excessive resin Pl is spilled from the optical disc 102A (FIG. 7(B)). Thereafter, the cap 150 in the center is removed (FIG. 7(C)), and while sucking the optical disc 102A (FIG. 7(D)) the disk proceeds to the ultraviolet irradiation step (not shown).

As discussed above, in this exemplary embodiment, the portion A3 corresponding to a radial outer peripheral portion of the information recording area S (the minute concave and convex portions 132) of the information recording layer 108 on the upper surface of the substrate 104 is biased toward inside of the substrate 104 so that a thickness of the substrate 104 is smaller than that of the information recording area S.

Furthermore, according to this exemplary embodiment, the bias (the inclined plane 135A) of the substrate 104 is formed by the inclined plane 135 of the convex portion 140A in the outer peripheral portion A5 of the resin stamper 140. The convex portion 140A is specifically formed as the inclined plane 135 that is inclined toward the member on which transfer is performed (that is, the substrate 104) so that the thickness of the resin stamper 140 gradually increases in an outer radial direction.

Therefore, as shown in FIG. 1, even if the light transmissive layer 110 is formed by spin coating on the substrate 104 on which the information recording layer 108 is transferred, a raise 160, which is inevitably present as a result of the spin coating, is entirely absorbed by the inclined plane 135A in the outer peripheral area of the substrate 104. As a result, even if the raise 160 itself is present, it does not project beyond the light transmissive layer 110 as in conventional methods.

Therefore, the optical disc 102 can be fabricated without any post-treatments. The protective layer 118 is formed on the uppermost part as needed to complete the optical disc 102 fabricated by using the resin stamper 140 according to this exemplary embodiment.

Figure 8:
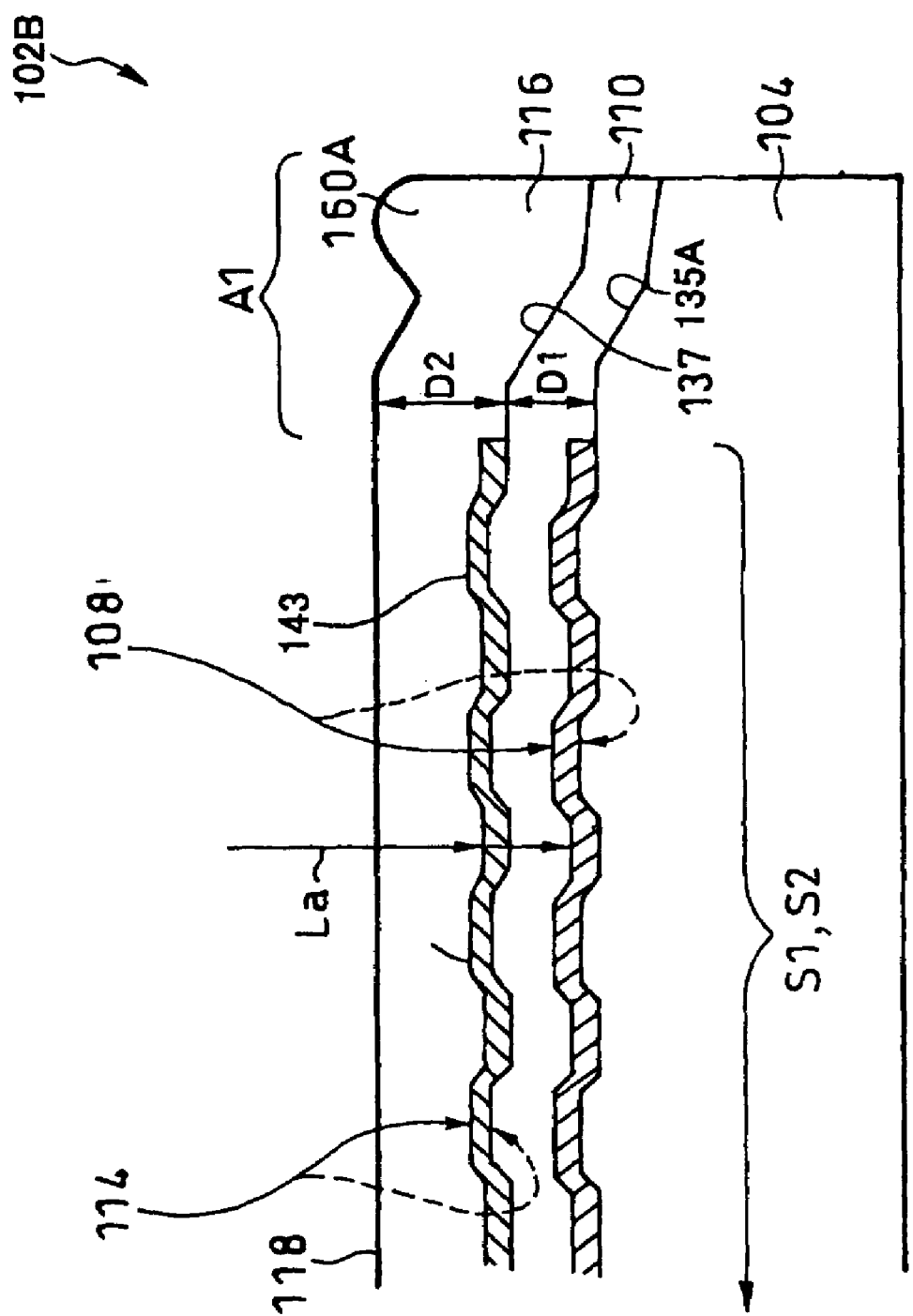
FIG. 8 is a cross-sectional view schematically showing the structure of the vicinity of an outer peripheral portion of a double-layered optical disc formed by using the stamper according to the present invention.

As shown in FIG. 8, in various other exemplary embodiments, the stamper according to the present invention may be used to easily fabricate a double-layered optical disc 102B, in which light is irradiated on the side of the thin light transmissive layer. In FIG. 8, similar parts to those in the above-described embodiment are denoted by the same reference numerals.

Specifically, in order to fabricate the double-layered optical disc 102B, the above-described light transmissive layer 110 is used as a first light transmissive layer. A second information recording layer 114 is formed thereon by using the resin stamper 140. Further, a second light transmissive layer 116 may be formed thereon.

Figure 9:
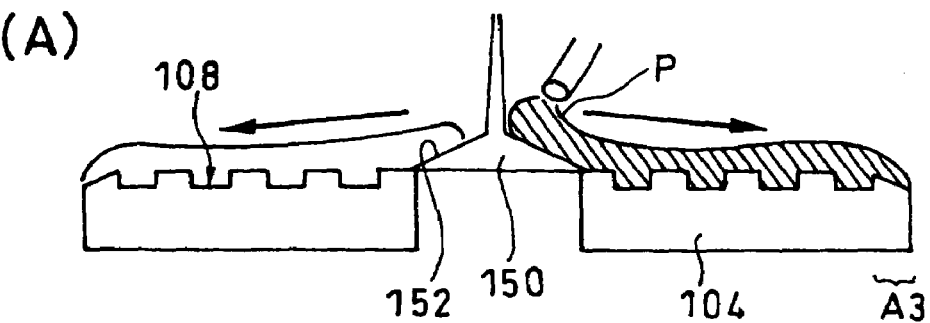
FIG. 9 is a cross-sectional view schematically showing various methods for forming a resin constituting a (first) light transmissive layer when the double-layered optical disc according to FIG. 8 is to be fabricated.
Figure 9:
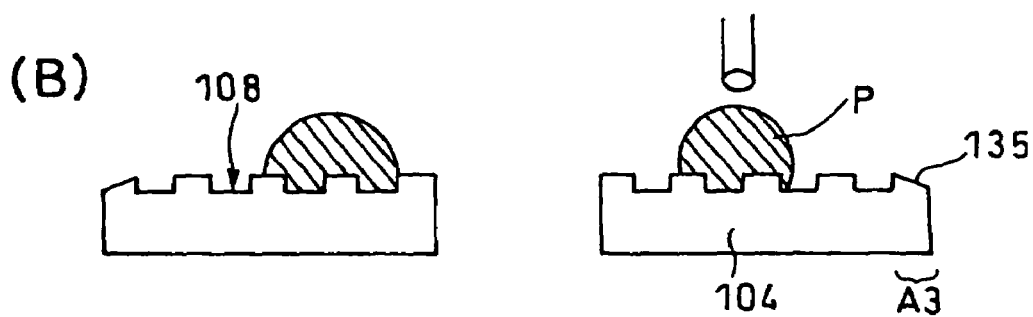
Figure 9:
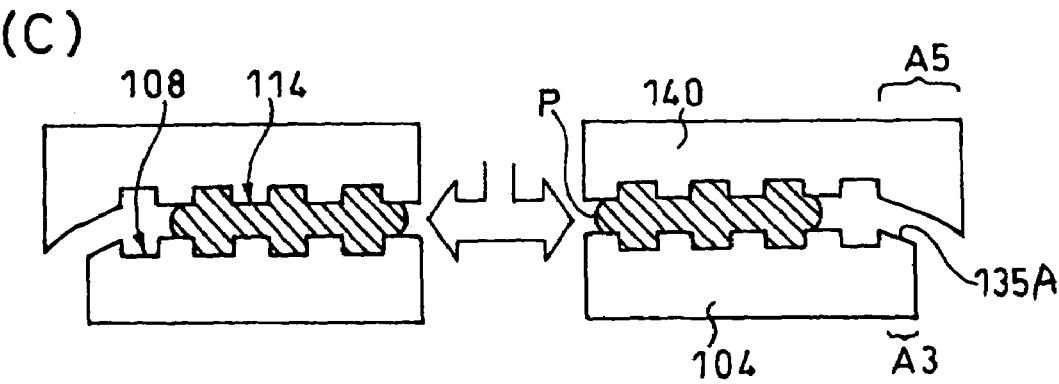

In this case, a number of methods may be used as a way of forming the second information recording layer 114. Any of the methods may realize the shaping of the (first) light transmissive layer 110 including the formation of the concave portion 135A and the transfer of the minute concave and convex portions 143 of the second information recording layer 114 by using the resin stamper 140 according to the present invention. Three exemplary methods are shown in FIG. 9.

An exemplary embodiment of a method shown in FIG. 9(A) employs the above-described spin coating without any modifications. The resin P is dropped along the inclined plane 152 of the cap 150 so as to be spread over the entire surface of the information recording layer 108 while rotating the substrate 104. The resin stamper 140 is placed thereon. The following Examples 1 and 2 also employ this method.

In another exemplary embodiment of a method, shown in FIG. 9(B), a predetermined amount of the resin P is dropped in a ring shape in the approximate center on the information recording layer 108 (the reflective film 106. Then, the stamper 140 is pressed thereon. The dropped resin P is spread over the entire surface of the information recording layer 108 by the pressing force.

In another exemplary embodiment of a method, shown in FIG. 9(C), the resin stamper 140 is placed in advance so as to be opposed to the information recording layer 108. Then, the resin P for the first light transmissive layer is injected into a space between them 140 and 108.

In any of the above described methods, the functions of the resin stamper 140 can be utilized in the completely same manner without any modifications. The minute concave and convex portions 143 of the second information recording layer 114 are similar to the minute concave and convex portions 132 of the above-described first information recording layer 108 and correspond to the negative pattern thereof (when seen from the side of the pickup, it becomes the positive pattern).

Figure 10:
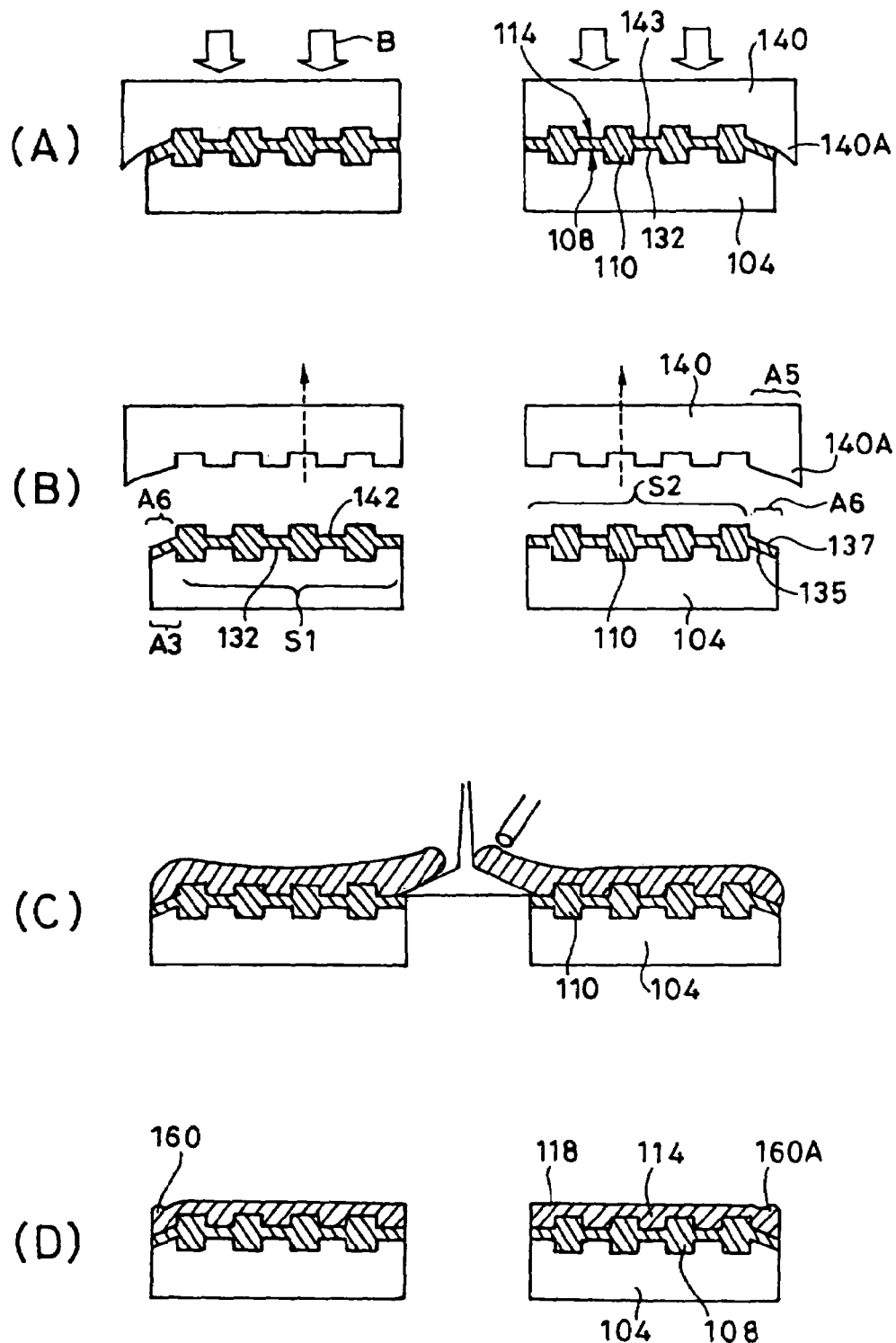
FIG. 10 is a process chart showing the second half of fabrication step of the above double-layered optical disc.
Figure 11:
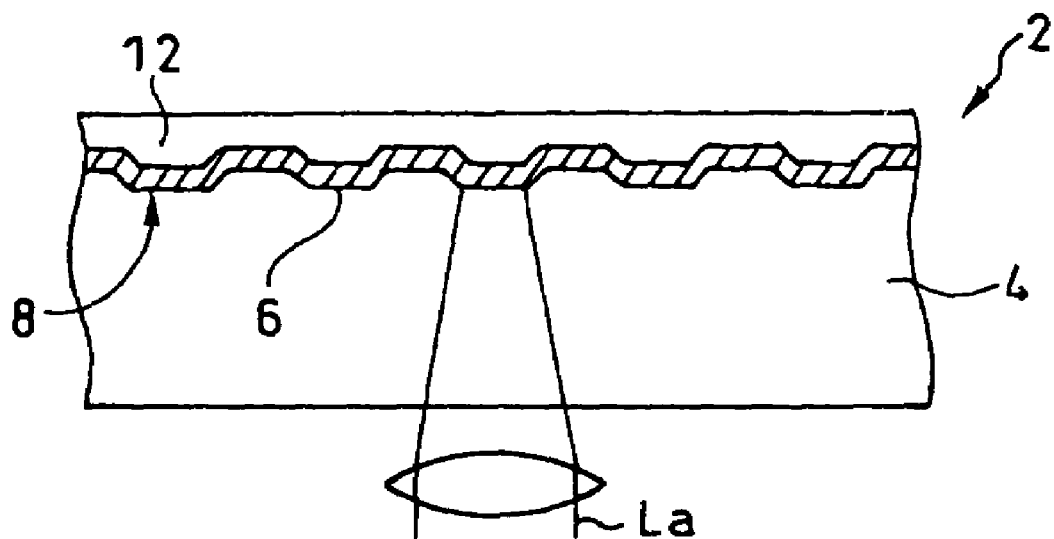
FIG. 11 is a partially enlarged cross-sectional view showing the structure of a conventional optical disc.

After removal of the resin stamper 140 as shown in FIGS. 10(A) and (B), the second light transmissive layer 116 is further formed on the first transmissive layer 110 by spin coating as shown in FIGS. 10(C) and (D). The raise 160A that is inevitably present at the formation of the second light transmissive layer 116 by the spin coating is prevented from being noticeable, due to the inclined plane in the first information recording layer 108 formed by convex portion 140A.

EXAMPLE 1

Herein, an experimental example will be described. The experimental example relates to prevention of generation of the raise 160A on the upper surface of the second light transmissive layer 116 owing to a bending shape of the outer peripheral portion of each layer of the thus formed double-layered optical disc 102A.

In this experiment, (as described above), the resin stamper 140 was fabricated by injection molding. The mother stamper 126M for resin stamper 140, which was attached to the mold 180 for molding, had a track pitch of 0.3 µm for groove recording.

For the substrate 104, (although slightly different from the above-described fabrication method in a strict sense) a polycarbonate resin was used (H4000-N282 fabricated by Mitsubishi Engineering-Plastics Corporation), the substrate 104 having an outer diameter of 12 cm and a thickness of 1.1 mm was molded at a mold temperature of 125° C., a resin melt temperature of 360° C., and a mold clamping force of 35 tons.

On the other hand, for the resin stamper 140, an olefin resin was used (ZEONEX-E28R fabricated by Zeon Corporation), the resin stamper 140 having an outer diameter of 12 cm and a thickness of 1.0 mm was molded at a mold temperature of 125° C., a resin melt temperature of 370° C. and a mold clamping force of 35 tons. An olefin resin was used as a material of the resin stamper 140 in view of ensuring of the ease of removal after transfer of the information recording layers 108 and 114 and the characteristic that a light transmittance at the above-described wavelength from 300 nm to 400 nm is 50% or more.

The outer peripheral shape of the substrate 104 is such that a thin-walled portion (the inclined plane 135A) starts from the position 1.0 mm away from the outer peripheral edge and a thickness (the amount of inclination) of the thin-walled portion (the inclined plane 135A) at the outer edge is 1.0 mm. Moreover, the outer peripheral shape of the resin stamper 140 is such that the convex portion 140A starts at the position 1.0 mm away from the outer peripheral edge of the corresponding optical disc substrate and a thickness (the amount of projection) of the convex portion 140A at the outer edge is 1.1 mm.

When the above-described double-layered optical disc 102B was fabricated by using the substrate 104 and resin stamper 140, the raise 160A in the outer peripheral portion did not project beyond the surface of the second light transmissive layer 116, corresponding to the information recording area S2, resulting in concave state of 20 µm.

COMPARATIVE EXAMPLE

An optical disc (102) was fabricated under the same conditions as those of the above-described Example 1 except that the combination was formed by the substrate (104) having a plane outer peripheral portion (on which the curved pattern is not formed) and the resin stamper (140). As a result, the raise (160) at the outermost periphery was in a convex state at 60 µm beyond the surface of the second light transmissive layer 116 corresponding to the information recording area (S2). This state requires post-treatment because there is a possibility that the raise may collide with a laser pickup for recording and reproduction in this state.

Even in the above-described optical disc 102 including only one layer, the same results can qualitatively be obtained regarding the prevention of the raise achieved by a change of the outer peripheral shape.

As a result, according to the various exemplary embodiments of the invention, any of the light transmissive layers, through which a laser beam passes, are formed by spin coating to have a small thickness of, for example, about 100 µm. Coma aberration can be kept small even if the numerical aperture NA is increased. Thus, a higher recording density results from the higher NA.

Moreover, owing to the bending shape in the outer peripheral portion, a raise on the surface of the coating can be substantially prevented on the surface of the disc while forming the light transmissive layer by spin coating. Therefore, no particular measure for smoothing the upper surface of the uppermost light transmissive layer is needed. A larger capacity and lower cost can be simultaneously achieved in a simple manner.

In the above-described embodiments, the thickness of the light transmissive layer is about 100 µm. However, in various other exemplary embodiments, the thickness of the light transmissive layer may be either larger or smaller. Accordingly, in those embodiments, the convex shape of the resin stamper should be changed appropriately in accordance with the thickness of the light transmissive layer to be formed thereon. Qualitatively, in the case where the light transmissive layer to be formed thereon is thin, the size of the convex shape may also be small. For example, about 5 µm is sufficient in some cases. However, in the case where the light transmissive layer is to be formed with a thickness of, for example, about 100 µm as in the above-described example, it is preferred to form the convex portion of 30 µm or more.

Furthermore, in other exemplary embodiments the convex shape may be, for example, steeper or flatter, as long as the surface of the light transmissive layer does not become convex as a result. It is another great advantage of the stamper according to the various exemplary embodiments of the invention that there exists the capability of flexibly responding to such trial and error or a change in design.

Still further, according to other exemplary embodiments of a method for fabricating the stamper according to the invention, a raise may be shaped in the outer peripheral portion into a predetermined shape, and then the cutting may be carried out after injection molding, or to bond two injection-molded products may be bonded with each other, so as to form a single stamper according to the present invention.

In the case where an optical disc is mass-produced, according to any of the above described embodiments, the shape of the raise in the outer peripheral portion of each optical disk is approximately the same because the rotational speed of the coating stage, or a component, a viscosity or the dropped amount of a resin is the same for each optical disc. Therefore, remarkably high reproducibility in the shape of each disk can be obtained.

Thus, for example, by adjusting the shape of the convex shape through the above-described trial and error, the surface of coating can be substantially leveled.

The invention claimed is:

1. A stamper for fabrication of an optical recording medium, comprising:
   an information recording area having a predetermined minute concavity and convexity on a transfer surface, wherein:
   the stamper is used for transferring the minute concavity and convexity in the information recording area onto an information recording area on a surface of a member on which transfer is performed;
   the stamper is not a constituent element of an optical recording medium; and
   a surface of an outer peripheral portion of the information recording area on the transfer surface is formed so as to be biased in a convex shape from the surface of the information recording area toward the member on which transfer is performed.

2. The stamper for fabrication of an optical recording medium according to claim 1, comprising a wobble signal in a groove of the minute concavity and convexity on the transfer surface.

3. The stamper for fabrication of an optical recording medium according to claim 1, wherein the bias in the convex shape on the surface of the outer peripheral portion of the information recording area on the transfer surface is biased from the surface of the information recording area by at least 5 µm or more.

4. The stamper for fabrication of an optical recording medium according to claim 1, wherein the bias in the convex shape on the surface of the outer peripheral portion of the information recording area on the transfer surface is inclined toward the member on which transfer is performed so that a thickness of the stamper is gradually increased in an outer radial direction.

5. The stamper for fabrication of an optical recording medium according to claim 1, wherein the stamper is made of a light transmissive resin having a transmittance of 50% or higher at a wavelength of 300 nm to 400 nm.

6. A method of forming an information recording area and a light transmissive layer of an optical recording medium, comprising the steps of:
   transferring, using a stamper having a predetermined minute concavity and convexity, the minute concavity and convexity onto an information recording area a of member on which transfer is performed;
   forming, using the stamper, a bias in a concave shape on a surface of an outer periphery of the member, the bias in the concave shape corresponding to a convex shape on the outer periphery of the stamper;
   forming a reflective film and/or a recording film at least on the transferred minute concavity and convexity on the information recording area; and
   forming a resin layer serving as a light transmissive layer on the area of the member, on which transfer is performed.

7. The method of forming an information recording area and a light transmissive layer according to claim 6, wherein:
   the stamper is made of a light transmissive resin having a transmittance of 50% or higher at a wavelength of 300 nm to 400 nm; and
   the member, on which transfer is performed, is made of an UV curable resin;
   the method further comprising, irradiating the member with an ultraviolet ray on a side of the member adjacent to the stamper to fix the minute concavity and convexity transferred onto the member and the bias in the concave shape corresponding to the convex shape.

8. The method of forming an information recording area and a light transmissive layer according to claim 6, wherein the member is made of a thermally curable resin, the method further comprising heating the member to fix the minute concavity and convexity transferred onto the member and the bias in the concave shape corresponding to the convex shape.

9. An optical recording medium having at least an information recording area and a light transmissive layer formed by the method of claim 6.

* * * * *